United States Patent
Lee et al.

(10) Patent No.: US 9,056,423 B2
(45) Date of Patent: Jun. 16, 2015

(54) MANUFACTURING METHOD OF AN ECO FRIENDLY FOAMING PACKAGE MATERIAL

(71) Applicant: TRI CAN CO., LTD., Hsinchu Hsien (TW)

(72) Inventors: Lucky Lee, Hsinchu (TW); Fong-Ru Yang, Hsinchu (TW); Sen-Fang Hsieh, Hsinchu County (TW); Jen-Hao Hsieh, Hsinchu County (TW)

(73) Assignee: TRI CAN CO., LTD., Hsinchu Hsien (TW)

( * ) Notice: Subject to any disclaimer, the term of this patent is extended or adjusted under 35 U.S.C. 154(b) by 301 days.

(21) Appl. No.: 13/861,161

(22) Filed: Apr. 11, 2013

(65) Prior Publication Data

US 2014/0306367 A1    Oct. 16, 2014

(51) Int. Cl.
   *C08J 9/00*     (2006.01)
   *B29C 44/00*    (2006.01)
   *B29C 44/34*    (2006.01)
   *C08J 9/32*     (2006.01)

(52) U.S. Cl.
   CPC ........... *B29C 67/2285* (2013.01); *C08J 9/0085* (2013.01); *C08J 9/32* (2013.01); *B29C 44/3457* (2013.01); *C08J 9/0023* (2013.01); *C08J 9/0066* (2013.01); *C08J 9/0061* (2013.01)

(58) Field of Classification Search
   CPC ...... C08J 9/0023; C08J 9/0061; C08J 9/0066; C08J 9/0085; C08J 9/32; B29C 44/3457
   USPC .................... 521/79, 182, 134, 139
   See application file for complete search history.

(56) References Cited

FOREIGN PATENT DOCUMENTS

| TW | 200716708 | 5/2007 |
|----|-----------|--------|
| TW | I280869   | 5/2007 |
| TW | I318996   | 1/2010 |

*Primary Examiner* — Jacob Thomas Minskey
(74) *Attorney, Agent, or Firm* — Rabin & Berdo, P.C.

(57) ABSTRACT

A manufacturing method of an eco friendly foam package material includes a raw material mixing step for mixing raw materials uniformly and thoroughly to form a mixed raw material, a raw material hybrid-melting step for performing a hybrid-melting process to form a hybrid-melted material, a particle forming step for performing the particle forming process by putting the hybrid-melted material into a pelletizer to form plastic particles, and a foam extrusion step. In the foam extrusion step the plastic particles are melted to become a gelatinous state material, and foamed with non-chemical method. Since the properties of the biodegradable polymer are changed by the decomposition enzyme, and further to mix with bio-cellulose and the industrial starch, such that the eco friendly foam package material with compostability is obtained.

8 Claims, 1 Drawing Sheet

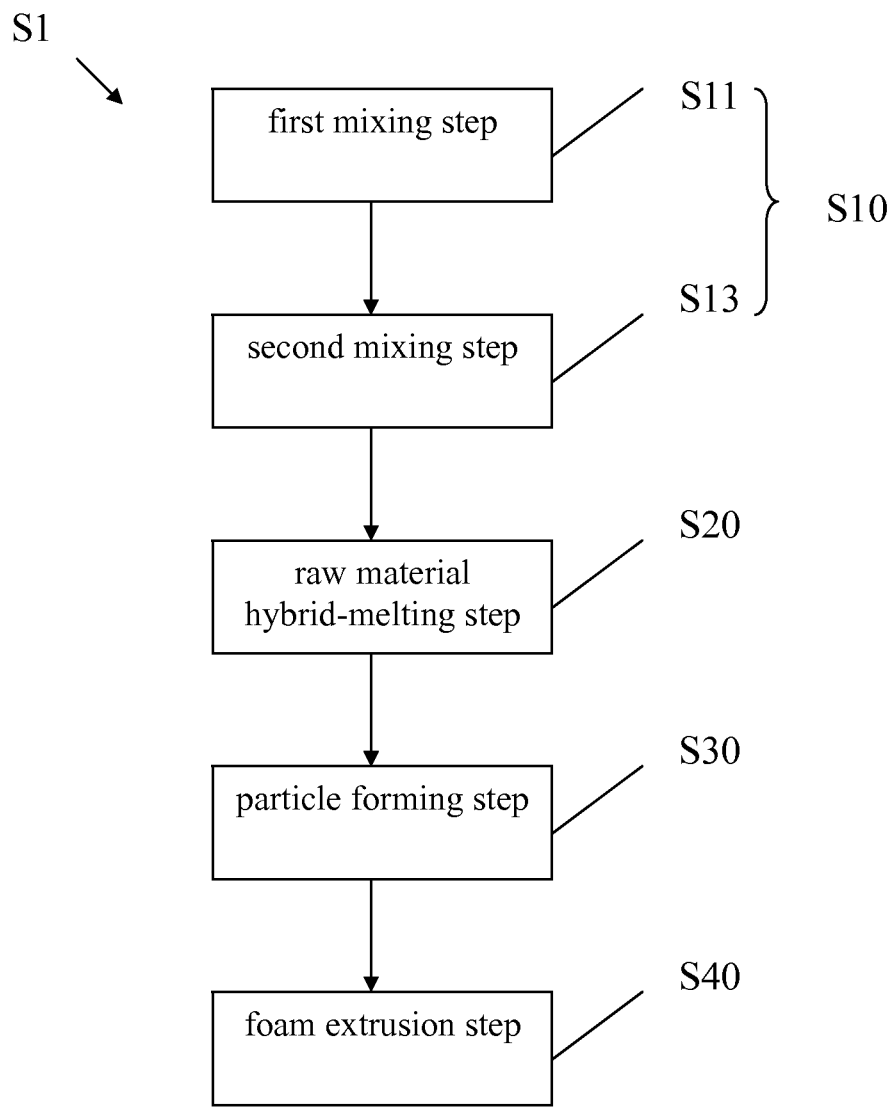

MANUFACTURING METHOD OF AN ECO FRIENDLY FOAMING PACKAGE MATERIAL

BACKGROUND OF THE INVENTION

1. Field of the Invention

The present invention generally relates to a package material, more particularly to a manufacturing method of an eco friendly foam package material, which is biodegradable and which has compost characteristics.

2. The Prior Arts

As long as the economic development is concerned, more attention is paid on use of global resource and environment protection. Even through disposable tableware made of the expandable polystyrene (EPS) has better heat/cold preservation effect than those made of paper, and the buffer materials made of foaming expandable polystyrene are widely used in package of household appliances, precision instruments, computers, and electrical devices. However, EPS is a polymer material, which is not biodegradable and which cannot be fully recycled. Since EPS is made from oil which is a non-renewable resource, and results in the environment pollution, such that the application of package material, which is not biodegradable naturally and which cannot be fully recycled, and hence the usage thereof is limited and will be knocked out finally while more attention is paid on the environment protection and environment pollution.

Since the EPS foaming plastic material is one product that can pollute the environment and is facing to be knocked out, and the package and lining materials made of paper pulp are the main succedaneum nowadays. The package and lining materials made of paper pulp have disadvantages of low impact resistance due to the fine micro structure, wherein the impact resistance is affected by the geometric structure of product. Nowadays, the package and lining materials made of paper pulp is only manufactured as small-sized wadding due to the limiting of molding and manufacturing method, and the large-sized wadding and filling material for large-sized household appliances are still made of EPS. Moreover, the cost of the package and lining materials made of paper pulp is much higher than those made of EPS, such that the development of the package and lining materials made of paper pulp is restricted.

Polylactic acid resin is a biodegradable material disclosed in prior art, such as Taiwan Patent No. 1318996 and Taiwan Patent Publication No. 200716708, however, those prior arts do not describe the foaming method for polylactic acid resin and the polylactic acid resin is not applied in buffer package material. Taiwan Patent No. 1280869 disclosed a foaming technology, however, it does not describe the application in biodegradable material, and it is noted that the processing is a chemical foaming method, and the method would pollute the environment.

Therefore, a green and eco friendly foam package material manufactured by non-pollution processes to replace the EPS and to meet the environment protection trend of 21 century is required.

SUMMARY OF THE INVENTION

An objective of the present invention is to provide a manufacturing method of an eco friendly foam package material. The manufacturing method includes a raw material mixing step, a raw material hybrid-melting step, a particle forming step, and a foam extrusion step. The raw materials are mixed uniformly and thoroughly in the raw material mixing step to form a mixed raw material. The mixed raw material is put in a kneader at 80° C.-100° C. for 1 to 3 hours to perform the hybrid-melting process in the raw material hybrid-melting step, and to form a hybrid-melted material. The hybrid-melted material is put into a pelletizer to perform the particle forming process in the particle forming step to form a plurality plastic particles. The plastic particles are put in an extrusion machine to perform shaping and foaming in the foam extrusion step, where the plastic particles are melted to become a gelatinous state material, and where $CO_2$ or $N_2$ is penetrated the gelatinous state material for foaming with non-chemical method. The foamed gelatinous state material is in form of a foaming plate material. The eco friendly foam package material is obtained after cooling the foaming plate material.

The raw materials include a biodegradable polymer, a decomposition enzyme, an interfacial compatibilizer, and additives. Moreover, the raw materials further include industrial starch and a bio-cellulose.

Since the properties of the biodegradable polymer is changed by the decomposition enzyme, and further to mix with bio-cellulose and the industrial starch, such that an eco friendly foam package material with compostability is obtained. The eco friendly foam package material of the present invention can be used as package buffer material, package reservoir, and package supporting material, and meets the object of resource sustainable utilization.

BRIEF DESCRIPTION OF THE DRAWINGS

The present invention can be understood in more detail by reading the subsequent detailed description in conjunction with the examples and references made to the accompanying drawings, wherein:

FIG. 1 is a flow chart of a manufacturing method of an eco friendly foam package material of the present invention.

DETAILED DESCRIPTION OF THE PREFERRED EMBODIMENT

The present invention may be embodied in various forms and the details of the preferred embodiments of the present invention will be described in the subsequent content with reference to the accompanying drawings. Modifications of the shape of the present invention shall too be considered to be within the spirit of the present invention.

FIG. 1 is a flow chart of a manufacturing method of an eco friendly foam package material of the present invention. As shown in FIG. 1, the manufacturing method of an eco friendly foam package material S1 of the present invention includes a raw material mixing step S10, a raw material hybrid-melting step S20, a particle forming step S30, and a foam extrusion step S40. The raw materials of eco friendly foam package material are mixed uniformly and thoroughly in the raw material mixing step S10, wherein the raw materials include a biodegradable polymer, a bio-cellulose, a decomposition enzyme, an industrial starch. Moreover, the raw materials further include additives such as an interfacial compatibilizer and a foam nucleating agent.

In addition, raw material mixing step S10 further includes a first mixing step S11 and a second mixing step S13. In the first mixing step S11, the biodegradable polymer 80~120 phr, the bio-cellulose 0-50 phr, and the decomposition enzyme 15~25 unit/g are mixed in a mixing machine for 30 mins with 250~350 rpm to form a pre-mixed material. In the second mixing step S13, the pre-mixed material, the industrial starch 0-50 phr, the interfacial compatibilizer 15~25 phr, and additives 15~30 phr are put in a stirring tank in sequence, and the combination is stirred for 100 mins with 15~30 rpm, finally a mixed raw material is obtained. The biodegradable polymer at least includes polylactic acid resin, the interfacial compatibilizer at least includes polyvinyl alcohol, the additives at least include silicate 3 phr and carbonate 5 phr, the bio-cellulose includes cellulose from paper, bagasse, palm and wood flour, and the decomposition enzyme includes at least one of isoamylase and pullulanase.

The mixed raw material is then put in a kneader to perform the hybrid-melting process in the raw material hybrid-melting step S20, wherein the hybrid-melting temperature is 80° C.~100° C. and the process time is 1 to 3 hour, then a hybrid-melted material is obtained. In the particle forming step S30, the hybrid-melted material is put into a pelletizer to perform the particle forming process, and a plurality plastic particles are obtained, wherein the hybrid-melted material is extruded along the ψ160 mm, passed 5-steps drums of 80° C./90° C./150° C./160° C./160° C. with 15~30 rpm in the pelletizer to form the plastic particles with particle size 3 mm~6 mm.

The plastic particles are put in a foam extrusion machine to perform shaping and foaming in the foam extrusion step S40. The foam extrusion machine has two screw rods arranged perpendicular to each other, wherein one screw rod has high temperature and is used to melt the plastic particles to form a gelatinous state material, and another screw rod is used for stirring the gelatinous state material and where $CO_2$ or $N_2$ is penetrated the gelatinous state material at the same time for foaming with non-chemical method, and then the foamed gelatinous state material is in form of a foaming plate material. The eco friendly foam package material is obtained after cooling the foaming plate material.

Table 1 is used to describe the examples 1-6, which are eco friendly foam package materials made by the manufacturing method of the present invention, and Table 2 is used to compare the physical properties of EPS and examples 1-6.

TABLE 1

| | Common raw materials | Bio-cellulose | Industrial starch |
|---|---|---|---|
| Example 1 | polylactic acid resin 100 phr, isoamylase 20 unit/g, polyvinyl alcohol 20 phr, silicate 3 phr, and carbonate 5 phr | 50 phr | 0 phr |
| Example 2 | polylactic acid resin 100 phr, isoamylase 20 unit/g, polyvinyl alcohol 20 phr, silicate 3 phr, and carbonate 5 phr | 40 phr | 10 phr |
| Example 3 | polylactic acid resin 100 phr, isoamylase 20 unit/g, polyvinyl alcohol 20 phr, silicate 3 phr, and carbonate 5 phr | 30 phr | 20 phr |
| Example 4 | polylactic acid resin 100 phr, isoamylase 20 unit/g, polyvinyl alcohol 20 phr, silicate 3 phr, and carbonate 5 phr | 20 phr | 30 phr |
| Example 5 | polylactic acid resin 100 phr, isoamylase 20 unit/g, polyvinyl alcohol 20 phr, silicate 3 phr, and carbonate 5 phr | 10 phr | 40 phr |
| Example 6 | polylactic acid resin 100 phr, isoamylase 20 unit/g, polyvinyl alcohol 20 phr, silicate 3 phr, and carbonate 5 phr | 0 phr | 50 phr |

TABLE 2

| | Compression strength kg/cm² (CNS 10132) 1.0~4.5 kg/cm² | Dimension change rate % 60° C. *2 hr (CNS 10132) <+1.0% | Compostability %/180 days (ASTM D6400-99) >90% |
|---|---|---|---|
| EPS | 2.80 | +0.6 | No |
| Example 1 | 3.55 | +0.45 | Yes |
| Example 2 | 3.25 | +0.42 | Yes |
| Example 3 | 2.87 | +0.40 | Yes |
| Example 4 | 2.78 | +0.27 | Yes |
| Example 5 | 2.50 | +0.43 | Yes |
| Example 6 | 2.70 | +0.45 | Yes |

Table 2 shows the comparison of EPS and Examples 1-6, the physical properties are tested after standing 3 days at a condition of 23° C. and 55% RH. The comparing results shows that the compostability of Examples 1-6 meets the requirement of ASTM D6400-99, the dimension change rate meets the requirement of CNS 10132, and the compression strength meets the requirement of CNS 10132, wherein the compostability and the dimension change rate of Examples 1-6 are far better than EPS.

The technical characteristics of the present invention are that change the properties of the biodegradable polymer with the decomposition enzyme, and then mixing with the bio-cellulose, and the industrial starch to form an eco friendly foam package material with good mechanical properties. The eco friendly foam package material can be used as package buffer material, package reservoir, and package supporting material. Since the polylactic acid resin is made from non-edible genetically modified corn organism, and the bio-cellulose and the industrial starch are rich natural polymer in the earth, such that the eco friendly foam package material can use to replace plastic material made from the oil, and there is no controversial issue on edible food. The eco friendly foam package material can be used in package field, and reduce the pressure of environment protection in world-wide trade. Moreover, the chemical foaming agent is not used in the manufacturing processes, so that there is no environment pollution in process and terminal products. The eco friendly foam package material of the present invention has advantages of simple processes, low cost, wide raw materials, and good properties. Moreover, it can reduce the carbon emission for slowing down the greenhouse effect and meet the object of resource sustainable utilization.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A manufacturing method of an eco friendly foam package material, comprising:
   a raw material mixing step for thoroughly mixing a plurality of raw materials to form a mixed raw material;
   a raw material hybrid-melting step for performing the hybrid-melting process by putting the mixed raw material into a kneader at 80° C.~100° C. for 1 to 3 hours to form a hybrid-melted material;
   a particle forming step for performing the particle forming process by putting the hybrid-melted material into a pelletizer to form a plurality plastic particles; and a foam extrusion step S40 for performing the shaping and foaming by putting the plastic particles in an extrusion machine, in which the plastic particles are melted into a gelatinous state material, and where $CO_2$ or $N_2$ is penetrated the gelatinous state material at the same time to foam with a non-chemical method, the foamed gelatinous state material is in form of a foaming plate material, finally the co friendly foam package material is obtained after cooling the foaming plate material, wherein the raw materials at least include a biodegradable polymer 80~120 phr, a decomposition enzyme 15~25 unit/g, an interfacial compatibilizer 15~25 phr, and additives 1~10 phr.

2. The manufacturing method as claimed in claim 1, wherein the raw materials further include a bio-cellulose 0-50 phr and an industrial starch 0-50 phr.

3. The manufacturing method as claimed in claim 2, wherein the biodegradable polymer at least includes polylactic acid resin, the interfacial compatibilizer at least includes polyvinyl alcohol, the bio-cellulose includes cellulose from paper, bagasse, palm and wood flour, the decomposition enzyme includes at least one of isoamylase and pullulanase, and the additives at least include silicate 3 phr and carbonate 5 phr.

4. The manufacturing method as claimed in claim 1, wherein the mixing step further includes a first mixing step for mixing the biodegradable polymer and the decomposition enzyme in a mixing machine for 30 mins with 250~350 rpm to form a pre-mixed material, and a second mixing step for mixing the pre-mixed material and the interfacial compatibilizer added in sequence in a stirring tank by stiffing for 100 mins to form the mixed raw material.

5. The manufacturing method as claimed in claim 4, wherein bio-cellulose 0-50 phr is further added in the first mixing step, and an industrial starch 0-50 phr is further added in the second mixing step.

6. The manufacturing method as claimed in claim 1, wherein a particle size of the plastic particles is 3~6 mm 7. The manufacturing method as claimed in claim 1, wherein the plastic particles are formed by extruding along the ψ160 mm, and passed 5-steps drums of 80° C./90° C./150° C./160° C./160° C. with 15~30 rpm in the pelletizer in the particle forming step.

8. The manufacturing method as claimed in claim 1, wherein the extrusion machine has two screw rods arranged perpendicular to each other, and one screw rod has high temperature and is used to melt the plastic particles to form the gelatinous state material, and another screw rod is used for stiffing the gelatinous state material while $CO_2$ or $N_2$ is penetrated the gelatinous state material at the same time for foaming with non-chemical method.

* * * * *